United States Patent
Kalinli-Akbacak

(10) Patent No.: US 9,020,822 B2
(45) Date of Patent: Apr. 28, 2015

(54) EMOTION RECOGNITION USING AUDITORY ATTENTION CUES EXTRACTED FROM USERS VOICE

(71) Applicant: Sony Computer Entertainment Inc., Tokyo (JP)

(72) Inventor: Ozlem Kalinli-Akbacak, Burlingame, CA (US)

(73) Assignee: Sony Computer Entertainment Inc., Tokyo (JP)

(*) Notice: Subject to any disclaimer, the term of this patent is extended or adjusted under 35 U.S.C. 154(b) by 233 days.

(21) Appl. No.: 13/655,825

(22) Filed: Oct. 19, 2012

(65) Prior Publication Data
US 2014/0114655 A1    Apr. 24, 2014

(51) Int. Cl.
| | | |
|---|---|---|
| G10L 21/00 | (2013.01) | |
| G10L 15/00 | (2013.01) | |
| G10L 25/63 | (2013.01) | |

(52) U.S. Cl.
CPC ............... *G10L 15/00* (2013.01); *G10L 25/63* (2013.01)

(58) Field of Classification Search
CPC ...................................................... G10L 25/63
See application file for complete search history.

(56) References Cited

U.S. PATENT DOCUMENTS

| | | |
|---|---|---|
| 4,594,575 A | 6/1986 | Avery et al. |
| 4,696,041 A | 9/1987 | Sakata |
| 4,975,960 A | 12/1990 | Petajan |
| 5,586,215 A | 12/1996 | Stork et al. |
| 5,806,036 A | 9/1998 | Stork |
| 5,852,669 A | 12/1998 | Eleftheriadis et al. |
| 5,897,616 A | 4/1999 | Kanevsky et al. |
| 5,940,794 A | 8/1999 | Abe |
| 6,161,090 A | 12/2000 | Kanevsky et al. |
| 6,185,529 B1 | 2/2001 | Chen et al. |
| 6,243,683 B1 | 6/2001 | Peters |
| 6,529,871 B1 | 3/2003 | Kanevsky et al. |
| 7,117,157 B1 | 10/2006 | Taylor |

(Continued)

FOREIGN PATENT DOCUMENTS

| | | |
|---|---|---|
| CN | 101315733 B | 6/2010 |
| JP | 2006031033 A | 2/2006 |

(Continued)

OTHER PUBLICATIONS

Kalinli, Ozlem, and Shrikanth S. Narayanan. "A saliency-based auditory attention model with applications to unsupervised prominent syllable detection in speech." INTERSPEECH. 2007.*

(Continued)

*Primary Examiner* — Brian Albertalli
(74) *Attorney, Agent, or Firm* — Joshua D. Isenberg; JDI Patent

(57) ABSTRACT

Emotion recognition may be implemented on an input window of sound. One or more auditory attention features may be extracted from an auditory spectrum for the window using one or more two-dimensional spectro-temporal receptive filters. One or more feature maps corresponding to the one or more auditory attention features may be generated. Auditory gist features may be extracted from feature maps, and the auditory gist features may be analyzed to determine one or more emotion classes corresponding to the input window of sound. In addition, a bottom-up auditory attention model may be used to select emotionally salient parts of speech and execute emotion recognition only on the salient parts of speech while ignoring the rest of the speech signal.

27 Claims, 6 Drawing Sheets

(56) References Cited

U.S. PATENT DOCUMENTS

| | | | |
|---|---|---|---|
| 7,165,029 B2 | 1/2007 | Nefian | |
| 7,209,883 B2 | 4/2007 | Nefian | |
| 7,454,342 B2 | 11/2008 | Nefian et al. | |
| 7,472,063 B2 | 12/2008 | Nefian et al. | |
| 7,742,914 B2 | 6/2010 | Kosek et al. | |
| 7,783,061 B2 | 8/2010 | Zalewski | |
| 7,809,145 B2 | 10/2010 | Mao | |
| 7,962,341 B2 | 6/2011 | Braunschweiler | |
| 8,209,182 B2* | 6/2012 | Narayanan | 704/270 |
| 8,463,719 B2* | 6/2013 | Lyon et al. | 706/12 |
| 8,600,749 B2 | 12/2013 | Ljolje | |
| 8,676,574 B2 | 3/2014 | Kalinli | |
| 8,756,061 B2 | 6/2014 | Kalinli et al. | |
| 2001/0051871 A1 | 12/2001 | Kroeker | |
| 2002/0128827 A1 | 9/2002 | Bu et al. | |
| 2002/0135618 A1 | 9/2002 | Maes et al. | |
| 2003/0018475 A1 | 1/2003 | Basu et al. | |
| 2004/0231498 A1 | 11/2004 | Li et al. | |
| 2006/0025989 A1 | 2/2006 | Mesgarani et al. | |
| 2006/0239471 A1 | 10/2006 | Mao | |
| 2007/0016426 A1 | 1/2007 | Hershey et al. | |
| 2008/0133228 A1 | 6/2008 | Rao | |
| 2008/0201134 A1 | 8/2008 | Iwakura et al. | |
| 2008/0201140 A1 | 8/2008 | Wells et al. | |
| 2008/0235582 A1 | 9/2008 | Zalewski et al. | |
| 2008/0249773 A1 | 10/2008 | Bejar et al. | |
| 2008/0262839 A1 | 10/2008 | Nonaka et al. | |
| 2009/0076817 A1 | 3/2009 | Jeon et al. | |
| 2009/0173216 A1 | 7/2009 | Gatzsche et al. | |
| 2009/0210220 A1 | 8/2009 | Mitsuyoshi et al. | |
| 2009/0265166 A1 | 10/2009 | Abe | |
| 2009/0313019 A1 | 12/2009 | Kato et al. | |
| 2010/0121638 A1 | 5/2010 | Pinson et al. | |
| 2010/0145695 A1 | 6/2010 | Jung et al. | |
| 2010/0280827 A1 | 11/2010 | Mukerjee et al. | |
| 2011/0004341 A1 | 1/2011 | Sarvadevabhatla et al. | |
| 2011/0009193 A1 | 1/2011 | Bond et al. | |
| 2011/0029314 A1 | 2/2011 | Lin et al. | |
| 2011/0075855 A1 | 3/2011 | Oh et al. | |
| 2011/0099009 A1 | 4/2011 | Zopf et al. | |
| 2011/0141258 A1 | 6/2011 | Song et al. | |
| 2011/0144986 A1 | 6/2011 | Yu et al. | |
| 2012/0116756 A1 | 5/2012 | Kalinli | |
| 2012/0197153 A1* | 8/2012 | Kraus et al. | 600/545 |
| 2012/0253812 A1 | 10/2012 | Kalinli et al. | |
| 2012/0259638 A1 | 10/2012 | Kalinli | |
| 2013/0144616 A1 | 6/2013 | Bangalore | |
| 2013/0262096 A1 | 10/2013 | Wilhelms-Tricarico et al. | |
| 2013/0304478 A1* | 11/2013 | Sun et al. | 704/273 |
| 2014/0112556 A1 | 4/2014 | Kalinli-Akbacak | |
| 2014/0149112 A1 | 5/2014 | Kalinli-Akbacak | |

FOREIGN PATENT DOCUMENTS

| | | |
|---|---|---|
| RU | 2403626 C2 | 11/2010 |
| WO | 2012134541 A | 10/2012 |

OTHER PUBLICATIONS

Harding, Sue, Martin Cooke, and Peter König. "Auditory gist perception: an alternative to attentional selection of auditory streams?." Attention in Cognitive Systems. Theories and Systems from an Interdisciplinary Viewpoint. Springer Berlin Heidelberg, 2007. 399-416.*

Chi, Tai-Shih, Lan-Ying Yeh, and Chin-Cheng Hsu. "Robust emotion recognition by spectro-temporal modulation statistic features." Journal of Ambient Intelligence and Humanized Computing 3.1 (2012): 47-60.*

Kalinli, Ozlem, and Shrikanth Narayanan. "A top-down auditory attention model for learning task dependent influences on prominence detection in speech." Acoustics, Speech and Signal Processing, 2008. ICASSP 2008. IEEE International Conference on. IEEE, 2008.*

He, Ling, et al. "Study of empirical mode decomposition and spectral analysis for stress and emotion classification in natural speech." Biomedical Signal Processing and Control 6.2 (2011): 139-146.*

Kayser, Christoph, et al. "Mechanisms for allocating auditory attention: an auditory saliency map." Current Biology 15.21 (2005): 1943-1947.*

Schuller, Björn, et al. "Recognising realistic emotions and affect in speech: State of the art and lessons learnt from the first challenge." Speech Communication 53.9 (2011): 1062-1087.*

Wu, Siqing, Tiago H. Falk, and Wai-Yip Chan. "Automatic speech emotion recognition using modulation spectral features." Speech Communication 53.5 (2011): 768-785.*

El Ayadi, Moataz, Mohamed S. Kamel, and Fakhri Karray. "Survey on speech emotion recognition: Features, classification schemes, and databases." Pattern Recognition 44.3 (2011): 572-587.*

Chi, Taishih, Powen Ru, and Shihab A. Shamma. "Multiresolution spectrotemporal analysis of complex sounds." The Journal of the Acoustical Society of America 118.2 (2005): 887-906.*

Ezzat, Tony, Jake V. Bouvrie, and Tomaso Poggio. "Spectro-temporal analysis of speech using 2-d Gabor filters." INTERSPEECH. 2007.*

"Yoshio Matsumoto et al, ""An Algorithm for Real-time Stereo Vision Implementation of Head Pose and Gaze Direction Measurement"", IEEE International Conference on Automatic Face and Gesture Recognition—FGR, pp. 499-505, 2000".

Athanasios Nikolaidis et al, "Facial feature extraction and pose determination", Pattern Recognition, vol. 33 pp. 1783-1791, 2000.

Chris Ziegler, "Tobii and Lenovo show off prototype eye-controlled laptop, we go eyes-on (video)" downloaded from the Internet, downloaded from <http://www.engadget.com/2011/03/01/tobii-and-lenovo-show-off-prototype-eye-controlled-laptop-we-go/>, Mar. 1, 2011.

Dagen Wang et al. "Robust Speech Rate Estimation for Spontaneous Speech", IEEE Transactions on Audio, Speech, and Language Processing, vol. 15, No. 8, Nov. 2007.

Erik Murphy-Chutorian, "Head Pose Estimation in Computer Vision: A Survey", IEEE Transactions on Pattern Analysis and Machine Intelligence, vol. 31, No. 4, pp. 607-626, 2009.

Extended European Search Report dated Jul. 3, 2012 issued for European Patent Application No. 12162896.0.

Henning Risvik, "Principal Component Analysis (PCA) & NIPALS algorithm", May 10, 2007, dowloaded from http://share.auditory.ru/2006/Ivan.Ignatyev/AD/pca_nipals.pdf.

International Search Report & Written Opinion in International Application No. PCT/US2011/052192 mailed Apr. 9, 2012.

International Search Report issued date Mar. 8, 2012 for International Application No. PCT/US/2011/059004.

Intonation in linguistic: http://en.wikipedia.org/wiki/Intonation_(linguistics).

Qiang Ji et al, "3D face pose estimation and tracking from a monocular camera" in Image Vision and Computing, vol. 20m Issue 7, May 1, 2002, pp. 499-511.

T. Nagarajan et al. "Segmentation of speech into syllable-like units", Department of Computer Science and Engineering Indian Institute of Technology, Madras, Eurospeech 2003—Geneva.

Tone in linguistic: http://en.wikipedia.org/wiki/Tone_(linguistics).

Yaodong Zhang et al. "Speech Rhythm Guided Syllable Nuclei Detection" MIT Computer Science and Artificial Intelligence Laboratory, Cambridge, Massachusetts 02139, USA {ydzhang, glass}@csail.mit.edu.

Non-Final Office Action mailed date Dec. 28, 2012 issued for U.S. Appl. No. 13/083,356.

U.S. Appl. No. 13/655,834 to Ozlem Kalinli-Akbacak, filed Oct. 19, 2012.

International Search Report and Written Opinion for International Application No. PCT/US2013/064701, dated Feb. 20, 2014.

International Search Report and Written Opinion for International Application No. PCT/US2013/071337, dated Mar. 27, 2014.

Notice of Allowance for U.S. Appl. No. 12/943,744, dated Oct. 28, 2013.

Notice of Allowance for U.S. Appl. No. 13/078,886, dated Feb. 3, 2014.

Kalinli et al., 'prominence detection using auditory attention cues and task-dependent high level information', IEEE, transaction on audio, speech, and language processing, vol. 17, No. 5 Jul. 2009.

(56) References Cited

OTHER PUBLICATIONS

Kalinli et al., saliency-driven unstructured acoustic scene classification using latent perceptual indexing, IEEE, MMSP'09, Oct. 5-7, 2009.

Non Final Office Action dated Sep. 17, 2013 issued for U.S. Appl. No. 13/078,866.

Non Final Office Action for U.S. Appl. No. 12/943,774, dated Jul. 1, 2013.

Chinese Office Action for CN Application No. 201180069832.3, dated Sep. 22, 2014.

Co-Pending U.S. Appl. No. 14/307,426, filed Jun. 17, 2014.

IBM, "Cell Broadband Engine Architecture", Oct. 2007, downloaded from the web, https://www-01.ibm.com/chips/techlib/techlib.nsf/techdocs/1AEEE1270EA2776387257060006E61BA/$file/CBEA_v1.02_11Oct2007_pub.pdf.

Intonation in linguistic: http://en.wikipedia.org/wiki/Intonation_(linguistics), downloaded from web Jun. 4, 2012.

Non-Final Office Action for U.S. Appl. No. 13/655,834, dated Sep. 5, 2014.

Non-Final Office Action for U.S. Appl. 13/901,426, dated Oct. 8, 2014.

Yaodong Zhang et al., "Speech Rhythm Guided Syllable Nuclei Detection", ICASSP 2009. IEEE International Conference on Acoustics, Speech and Signal Processing, pp. 3797-3800, Apr. 19-24, 2009.

Notice of Allowance for U.S. Appl. No. 13/655,834, dated Jan. 2, 2015.

\* cited by examiner

EMOTION RECOGNITION USING AUDITORY ATTENTION CUES EXTRACTED FROM USERS VOICE

FIELD OF THE DISCLOSURE

Aspects of the present disclosure are related to emotion recognition and more particularly to emotion recognition based on auditory attention cues.

BACKGROUND OF THE DISCLOSURE

Emotion recognition or understanding the state of the user is important and beneficial for many applications; including games, man-machine interface, virtual agents, etc. For example, if emotional state of the user or game player is known, game/machine can dynamically adapt accordingly (i.e. in a simplistic case, game can become harder/easier). In addition, if there is voice recognition in the system; the emotion of the user can be used to adapt the models or to select appropriate models (acoustic and language models) dynamically to improve voice recognition performance.

Knowledge of user's emotion can be useful for many applications including call centers, virtual agents, and other natural user interfaces. Games can also use emotions as part of game input. For example some game applications can be as follows: whoever stays cool/calm under stress can get more points in the game. This can be used for educational games for kids (i.e. training for tests, performing under stress, reading/spelling tests etc.). Similarly, call centers can use the caller's emotion to decide what to do next. Intelligent man-machine interface can benefit from emotion information; i.e. machine can dynamically adapt based on a user's emotional state; i.e. knowing whether the user is happy, frustrated etc.

There can be even more applications that can benefit from emotion recognition such as training tools/programs for professionals: training medical doctors, training soldiers, training customer support staff, etc. This method can be used for both character analysis and user profile generation.

It is within this context that aspects of the present disclosure arise.

BRIEF DESCRIPTION OF THE DRAWINGS

The teachings of the present invention can be readily understood by considering the following detailed description in conjunction with the accompanying drawings, in which:

FIGS. 1B-1F are schematic diagrams illustrating examples of spectro-temporal receptive filters that can be used in conjunction with certain aspects of the present disclosure.

DETAILED DESCRIPTION

Figure 1A:
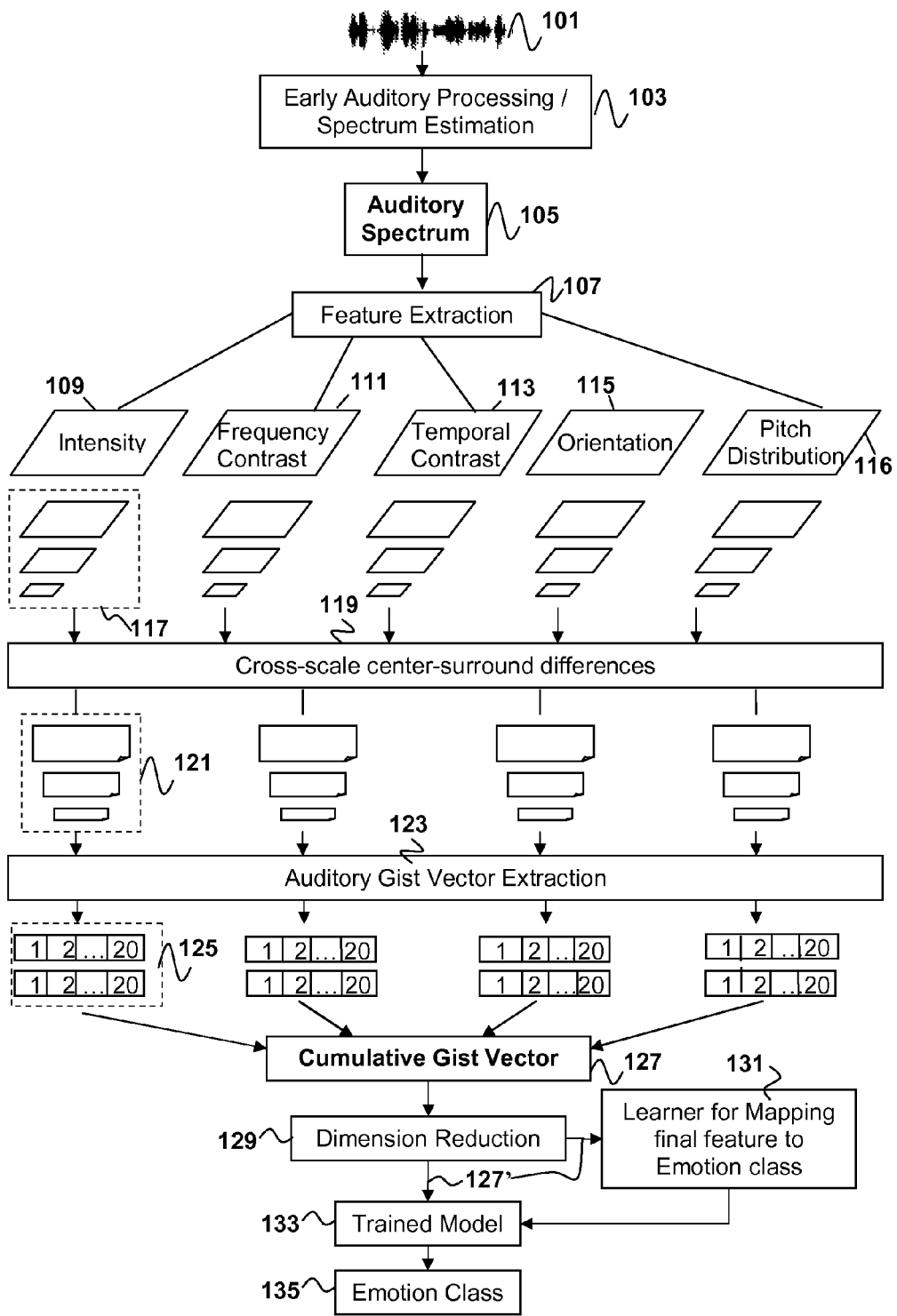
FIG. 1A is a flow diagram illustrating a method for emotion recognition using auditory attention cues according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Emotion recognition or understanding the mood of the user is important and beneficial for many applications; including games, an-machine interface, etc. Examples of how auditory attention features can successfully be used for tone and intonation recognition are described in commonly-assigned U.S. patent application Ser. No. 12/943,774, filed Nov. 10, 2010 and published as US Patent Application Publication Number 2012-0116756 A1 on May 10, 2012, the contents of both of which incorporated herein by reference. According to certain aspects of the present disclosure a new method is proposed for emotion recognition using auditory attention features.

According to certain aspects of the present disclosure a new method is proposed for emotion recognition using auditory attention features. In some implementations top-down auditory attention features may be used together with a machine learning algorithm to learn the mapping between emotion categories and the features mimicking a top-down task-dependent auditory attention model. According to certain other aspects of the present disclosure, a bottom-up saliency driven auditory attention model may be used to select emotionally salient parts of speech for emotion recognition. The bottom-up auditory attention model may be used to first detect emotionally salient parts of user's speech and then the top-down task-dependent auditory attention model does emotion recognition on the emotionally salient speech segments (rather than using the whole speech segment). This may provide performance improvement and computational benefits.

In traditional methods, prosodic features, (pitch, duration and energy, etc.), Mel frequency Cepstral Coefficients (MFFCCs), Mel filterbank features and the like have been used for emotion recognition from voice and usually every speech segment is used for recognition without any selection/weighting pre-processing. The performance of emotion recognition methods from acoustic signals using such traditional methods is usually rather limited. One caveat of the conventional emotion recognition approaches is that they process the entire signal or utterance fully and equally in detail (i.e. trying to find a matching emotion for each and every unit (i.e. phone/syllable/word etc.) in the utterance. This issue can be alleviated by taking advantage of a selective attention mechanism similar to that performed by the human auditory system.

The method and system described in the present disclosure are inspired by the human auditory attention system and uses auditory attention features for emotion recognition. Auditory attention cues are shown to be very good for capturing and modeling prosody related features, for example capturing raising and falling pitch, which is beneficial for tone and intonation recognition as described in U.S. patent application Ser. No. 12/943,774, and which is also needed for emotion recognition. It is also within the scope of the present disclosure to combine auditory attention features and prosodic features into an emotion recognition algorithm.

Also, certain implementations of the method and system are motivated by the bottom-up (BU) attention model of the human auditory system. In such implementations, salient events of voice may be extracted in an unsupervised manner. Then, only detected salient parts of a speech signal may be processed for emotion recognition. The selected salient events may be associated with previously learned representations for emotion recognition. Hence, for emotion recognition, instead of processing all input voice equally, a selection process can first be applied so that only emotionally salient parts of a speech signal are used for emotion recognition and the rest of the speech signal may be ignored for this purpose.

Auditory Attention Feature Extraction & Emotion Recognition

The auditory attention cues are biologically inspired and extracted by mimicking the processing stages in the human auditory system. A set of multi-scale features is extracted from the sound spectrum based on the processing stages in the central auditory system and converted to low-level auditory gist features.

The basic stages of the method may be summarized as follows.

The speech signal may be captured with a microphone, recorded, digitized, and stored in a computer memory or other non-transitory storage medium. First a spectrum of an input speech signal is computed based on an early auditory system model (or Fast Fourier Transform (FFT)). Next, multi-scale features based on central auditory system may be extracted from the spectrum using 2D spectro-temporal filters.

Center-surround differences may then be computed that compare fine and coarser scales of the multi-scale features. These differences may be used to form feature maps. Auditory gist features are then extracted from the feature maps, e.g., by dividing each feature map into m-by-n grids of sub-regions and computing statistics, e.g. mean, of each sub-region. In an optional stage, the dimension and redundancy of the extracted gist features may be reduced, e.g., using principle component analysis (PCA) or a discrete cosine transform (DCT), or Linear Discriminant Analysis (LDA). Final features referred to herein as an auditory gist may be obtained from the dimension/redundancy reduction. Alternatively, the features extracted from the feature maps may be used as the final features (i.e., as the auditory gist).

In some implementations, traditional features (i.e. prosodic features, MEL filterbank energy, mel frequency cepstral coefficient (MFCC), etc.) may be extracted in addition to the attention features and used for emotion recognition to further improve results. The features may be extracted, e.g., using a window that centers on each syllable/word/phrase or for each frame using a sliding window. Then, a decision can be made at each level (syllable/words/phrase) or by combining these results over a longer duration i.e. sentence/session etc.

A neural network or other model training mechanism may be used to train models and learn mapping between final features and emotion classes, e.g., to find the auditory gist or their combination that correspond to emotion classes such as angry, happy, sad, etc. The training of these models may be done during a separate training operation using input voice signals associated with one or more emotional classes. The resulting trained models may be used during regular operation to recognize emotions from a voice signal by passing auditory gist features obtained from the voice signal through the trained models.

According to aspects of the present disclosure, emotions may be designed as discrete categories; i.e. happy, angry, neutral, sad, bored, emphatic, irritated, surprised, and the like. The user's emotional state can be categorized into one of these categories. A soft decision process can also be used where at a given time the user's emotion is represented as a mixture of above categories: e.g., one that shows at a certain time how happy a person is, and how sad the person is at the same time etc.

In addition, aforementioned cues can be used to recognize emotion in a 3D valence-activation-time representation. As used herein the term "valence" is used to categorize emotion classes as being either "positive" or "negative". Examples of emotions with negative valence include anger, sadness, despair, and irritation. Examples of emotions with positive valence include interest, pleasure, joy, and pride. Activation generally refers to the intensity or strength of the emotion.

FIG. 1A is a flow diagram illustrating a method and system for emotion recognition using auditory attention cues according to an aspect of the present disclosure. The method illustrated in FIG. 1A is a top-down task-dependent auditory attention model where the task is emotion recognition in present invention. The auditory attention model is biologically inspired and mimics the processing stages found in the human auditory system. The auditory attention model is designed to determine when and where sound signals attract human attention.

Initially a signal corresponding to an input window of sound 101 is received. By way of example, and not by way of limitation, this input window of sound 101 may be captured over a time window of some finite duration using a microphone which acts to convert the acoustic waves that characterize a particular input window of sound 101 into an electric signal for further processing. The input window of sound 101 may be any segment of a person's speech. By way of example, and not by way of limitation, the input window of sound 101 may contain a single syllable, word, sentence, or any combination of these. The input window of sound 101 is then passed through a set of processing stages 103 that operate to convert this window of sound 101 into an audio spectrum 105. These processing stages 103 can be based on the early processing stages of an auditory system, such as the human auditory system. By way of example, and not by way of limitation, the processing stages 103 may consist of cochlear filtering, inner hair cell, and lateral inhibitory stages mimicking the process from basilar membrane to the cochlear nucleus in the auditory system. The cochlear filtering may be implemented using a bank of 128 overlapping constant-Q asymmetric band pass filters with center frequencies that are uniformly distributed along a logarithmic frequency axis. These filters may be implemented by suitably configured electronic hardware, which may be purpose-built. Alternatively, the filters may be implemented on a general-purpose computer programmed with software that implements the functions of the filters. For analysis, 20 ms frames of audio with 10 ms shift can be used, which result in each audio frame being represented by a 128 dimensional vector. Alternatively, audio spectrum can be computed using FFT algorithm. The spectrum may optionally be mapped to a nonlinear frequency scale; i.e. Mel scale, Bark scale etc. Once the input window of sound 101 has been converted into an auditory spectrum 105, the spectrum 105 is analyzed by extracting multi-scale features 117, as indicated at 107, by mimicking the information processing stages in the central auditory system. Auditory attention can be captured by or voluntarily directed to a wide variety of acoustical features such as intensity (or energy), frequency, temporal, pitch, timbre, FM direction or slope (called "orientation" here), etc. These features can be selected and implemented to mimic the receptive fields in the primary auditory cortex.

By way of example, and not by way of limitation, four features that can be included in the model to encompass the aforementioned features are intensity (I), frequency contrast (F), temporal contrast (T), and orientation ($O_\theta$) with orientation angle θ={45°,135°}. The intensity feature captures signal characteristics related to the intensity or energy of the signal. The frequency contrast feature F captures signal characteristics related to spectral (frequency) changes of the signal. The temporal contrast feature T captures signal characteristics related to temporal changes in the signal. The orientation filters 115 are sensitive to moving ripples in the signal.

Each feature may be extracted using two-dimensional spectro-temporal receptive filters 109, 111, 113, 115 which mimic the certain receptive fields in the primary auditory cortex. FIGS. 1B-1F respectively illustrate examples of the receptive filters (RF) 109, 111, 113, 115. Each of the receptive filters (RF) 109, 111, 113, 115 simulated for feature extraction is illustrated with gray scaled images corresponding to the feature being extracted.

An excitation phase 110 and inhibition phase 112 are shown with white and black color, respectively.

Each of these filters 109, 111, 113, 115 is capable of detecting and capturing certain changes in signal characteristics. For example, the intensity filter 109 illustrated in FIG. 1B may be configured to mimic the receptive fields in the auditory cortex with only an excitatory phase selective for a particular region, so that it detects and captures changes in intensity/energy over the duration of the input window of sound. Similarly, the frequency contrast filter 111 depicted in FIG. 1C may be configured to correspond to receptive fields in the primary auditory cortex with an excitatory phase and simultaneous symmetric inhibitory sidebands. The temporal contrast filter 113 illustrated in FIG. 1D may be configured to correspond to the receptive fields with an inhibitory phase and a subsequent excitatory phase.

Figure 1F:
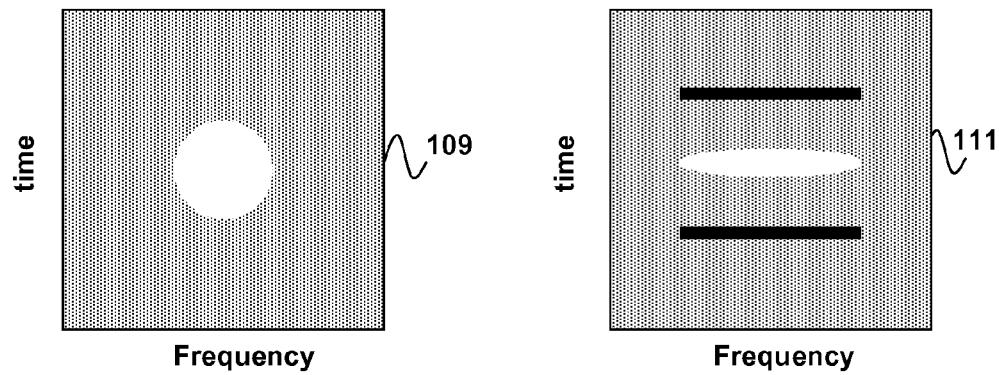
Figure 1F:
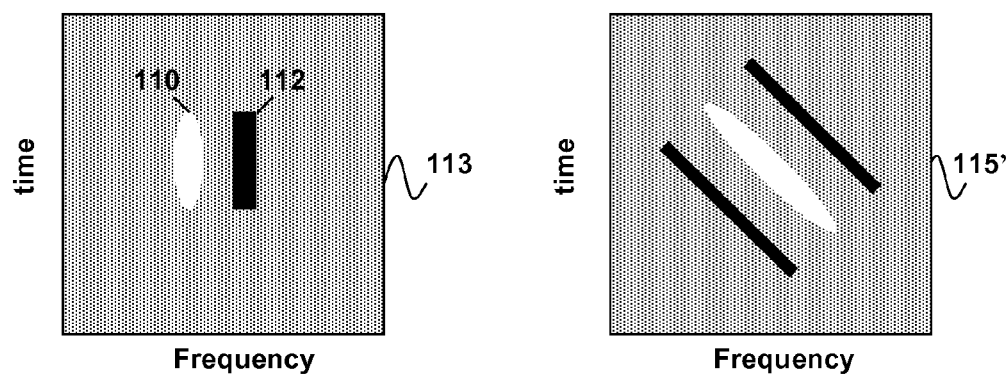
Figure 1F:
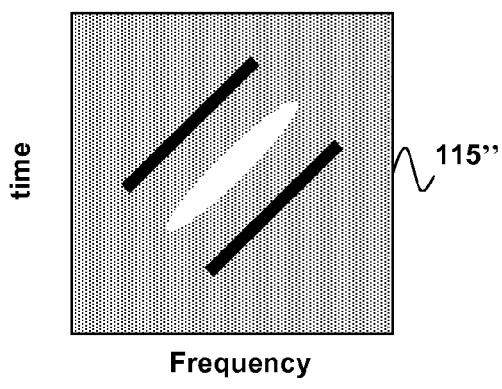

The frequency contrast filter 111 shown in FIG. 1C detects and captures spectral changes over the duration of the sound window. The temporal contrast filter 113 shown in FIG. 1D detects and captures changes in the temporal domain. The orientation filters 115' and 115" mimic the dynamics of the auditory neuron responses to moving ripples. The orientation filter 115' can be configured with excitation and inhibition phases having 45° orientation as shown in FIG. 1E to detect and capture when ripple is moving upwards. Similarly, the orientation filter 115" can be configured with excitation and inhibition phases having 135° orientation as shown in FIG. 1F to detect and capture when ripple is moving downwards. Hence, these filters also capture when pitch is rising or falling.

The RF for generating frequency contrast 111, temporal contrast 113 and orientation features 115 can be implemented using two-dimensional Gabor filters with varying angles. The filters used for frequency and temporal contrast features can be interpreted as horizontal and vertical orientation filters, respectively, and can be implemented with two-dimensional Gabor filters with 0° and 90°, orientations. Similarly, the orientation features can be extracted using two-dimensional Gabor filters with {45°, 135°} orientations. The RF for generating the intensity feature 109 is implemented using a two-dimensional Gaussian kernel.

In some implementations an optional pitch filter 116 may be included along with the other two-dimensional spectro-temporal receptive filters 109, 111, 113, 115 to extract multi-scale pitch features (P). It is noted that functional imaging studies have shown that the neurons of the auditory cortex also respond to pitch. By way of example, and not by way of limitation, pitch may be extracted based on a temporal hypothesis which assumes that the brain estimates the periodicity of the waveform in each auditory nerve fiber by auto-correlation. Then, a piecewise second-order polynomial model may be fit to the estimated pitch values in the voiced regions for smoothing. Computed pitch values may be mapped to the tonotopic cortical axes assuming that the auditory neurons in the cochlear location corresponding to the pitch are fired. Then, multi-scale pitch distribution features (P) may be created using a dyadic Gaussian pyramid identical to the one used by the intensity filter 109, and/or using the frequency contrast filter 111, and/or using the orientation filters 115.

The feature extraction 107 is completed using a multi-scale platform. The motivation for generating a scale-space representation of a given data set originates from the basic observation that objects are composed of different structures at different scales. For a system analyzing an unknown set of data, there is no way to know a priori what scales are appropriate for describing the interesting structures associated with the data. The only reasonable approach is thus to consider descriptions at multiple scales in order to capture the unknown scale variations that may occur. In embodiments of the present invention, the multi-scale features 117 may be obtained using a dyadic pyramid (i.e., the input spectrum is filtered and decimated by a factor of two, and this is repeated). As a result, eight scales are created (e.g., if the window duration is larger than 1.28 seconds when the frame shift is 10 ms, otherwise there are fewer scales), yielding size reduction factors ranging from 1:1 (scale 1) to 1:128 (scale 8).

Prior art approaches to analysis of speech signals often required that each speaker's features be normalized before distinguishing between emotions, to ensure accuracy. For example, each speaker's pitch was normalized, since each speaker had a different baseline pitch when speaking (e.g., female voices compared to male voices) normalization was necessary in order to identify a relative pitch associated with a given emotion for each individual speaker. In embodiments of the present invention, extracted features computes contrast and can capture the signal characteristic variations (i.e. relative intensity change) rather than the absolute values of signal characteristics due to the design of the filters used, and so normalization is no longer necessary for each individual speaker in order to recognize emotion classes.

After multi-scale features 117 are obtained, feature maps 121 are generated as indicated at 119 using those multi-scale features 117. This is accomplished by computing "center-surround" differences, which involves comparing "center" (fine) scales with "surround" (coarser) scales. The center-surround operation mimics the properties of local cortical inhibition and detects the local temporal and spatial discontinuities. It is simulated by across scale subtraction ($\ominus$) between a "center" fine scale (c) and a "surround" coarser scale (s), yielding a feature map M (c, s): M (c, s)=|M(c)$\ominus$M(s)|, M$\in$$\{I, F, T, O_\theta, P\}$. The across scale subtraction between two scales is computed by interpolation to the finer scale and point-wise subtraction. By way of example, and not by way of limitation, c={2, 3, 4}, s=c+δ, with δ$\in$ {3, 4} may be used. By way of example, and not by way of limitation, 36 feature maps may be computed: six for each intensity, frequency contrast, temporal contrast, pitch (when there is one filter) and twelve for orientation if there are two orientation angles, e.g., θ={45°, 135°}.

Next, an "auditory gist" vector 125 is extracted as indicated at 123 from each feature map 121 of I, F, T, $O_\theta$, P such that the sum of auditory gist vectors 125 covers the entire input sound window 101 at low resolution. To determine the auditory gist vector 125 for a given feature map 121, the feature map 121 is first divided into an m-by-n grid of sub-regions, and statistics, such as maximum, minimum, mean, standard deviation etc., of each sub-region can be computed. By way of example, and not by way of limitation, the mean of each sub-region can be computed to capture the overall properties of the map. For a feature map with height h and width w, the computation of the auditory gist vector can be written as:

$$G_i^{k,l} = \frac{mn}{wh} \sum_{u=\frac{wk}{n}}^{\frac{(k+1)w}{n}-1} \sum_{v=\frac{lh}{m}}^{\frac{l+1h}{m}-1} M_i(u,v),$$

for $k = \{0, \ldots n-1\}$, $l = \{0, \ldots m-1\}$.

An example of auditory gist vector extraction 123 with m=4, n=5 is shown in FIG. 1A, where a 20-dimensional auditory gist vector 125 is shown to represent a feature map. These particular values of m and n are provided as for the sake of example and not as limitations on any embodiment of the invention.

After extracting an auditory gist vector 125 from each feature map 121, the auditory gist vectors are augmented and combined to create a cumulative gist vector 127. The cumulative gist vector 127 may additionally undergo an optional dimension reduction 129 stage to reduce dimension and redundancy in order to make emotion recognition more practical. By way of example and not by way of limitation, principal component analysis (PCA) can be used for the dimension reduction operation 129. The result of the dimension reduction 129 is a reduced cumulative gist vector 127' that conveys the information in the cumulative gist vector 127 in fewer dimensions. PCA is commonly used as a primary technique in pattern recognition. As is generally understood, PCA is mathematically defined as an orthogonal linear transformation that transforms data to a new coordinate system such that the greatest variance by any projection of the data comes to lie on the first coordinate (called the first principal component), the second greatest variance on the second coordinate, and so on. PCA may be implemented on a computer programmed with suitably configured software. Examples of commercially available software that can implement dimension reduction through PCA include Matlab by MathWorks, Inc. of Natick, Mass., U.S.A. or Weka machine learning software, developed at the University of Waikato, New Zealand. Alternatively, other linear and nonlinear dimension reduction techniques, such as factor analysis, kernel PCA, linear discriminant analysis (LDA), Discrete Cosine Transform (DCT) and the like, may be used to implement the dimension reduction 129.

Finally, after the reduced cumulative gist vector 127' that characterizes the input sound window 101 has been determined, emotion recognition may be performed. To perform emotion recognition on a given input sound window, a machine learning algorithm 131, such as a neural network, nearest neighbor classifier, decision tree, and the like, may be used to discover the mapping between cumulative gist vectors 127 and emotion class(es) and produce or update a trained model 133 configured to implement the mapping. Usually, a large number of speech samples is used for training and producing the model 133. By way of example and not by way of limitation, a neural network may be used as the machine learning algorithm 131 since it is biologically well motivated. In such a case, the machine learning algorithm 131 can produce a trained model that can identify the emotion class(es) of the input window of sound 101 given the corresponding cumulative gist vector 127'.

As used herein, the term "neural network" refers to an interconnected group of natural or artificial neurons that uses a computational/mathematical model for information processing based on a connectionistic approach to computation. Neural networks are adaptive systems that change structure based on external or internal information that flows through the network. They are used to implement non-linear statistical data modeling and may be used to model complex relationships between inputs and outputs. In embodiments of the present invention, the neural network can be used for learning mapping between a group of auditory gist features represented by a cumulative auditory gist vector 127 or reduced cumulative gist vector 127' and one or more emotion classes. By way of example, and not by way of limitation, a 3-layer neural network may be used. The neural network may have D inputs, (D+N)/2 hidden nodes and N output nodes, where D is the length of the cumulative auditory gist vector after PCA dimension reduction and N is the number of emotion classes to be distinguished.

Assuming a trained model 133 has been sufficiently trained, the trained model may be used for emotion classification during regular operation to map auditory gist features (e.g., the cumulative gist vector 127') to the corresponding emotion class by processing it through the trained model. The machine learning algorithm 131 may be omitted during regular operation once the model 133 has been sufficiently trained. Alternatively, the model 133 may be updated during regular operation in conjunction with emotion recognition.

In initial emotion recognition experiments, more than 90% accuracy was achieved in 2-class emotion classification between neutral and hot anger using auditory gist features. Here, the Emotional Prosody Speech and Transcripts (EPST) database was used for the experiments. The EPST consists of speech from seven speakers in English.

Salient Event Detection for Emotion Recognition

According to certain aspects of the present disclosure, emotion recognition may be enhanced through detection of salient events. Salient events may be defined as those portions of the speech signal that perceptually stand-out from the rest of the sound by significantly differing from their neighbors. For example, when people get emotional, they tend to change characteristics of their voice signal; e.g., by increasing their volume (here called intensity), by increasing their pitch, etc. Here it is proposed to use a bottom-up saliency driven auditory attention model to detect these emotionally salient events in speech and use them for emotion recognition.

Salient event detection has the potential to improve emotion recognition accuracy by filtering out what may amount to noise for emotion classification. For example, traditional emotion recognition methods process the entire sound signal fully and equally by recognizing emotional content of each and every acoustic event/word in a sentence to decide for the emotion of the whole utterance. In contrast, humans process an acoustic scene/utterance selectively by processing only the acoustic events/words that attract their attention in detail. Hence, by filtering out irrelevant information, saliency-driven emotion recognition has the potential to improve recognition accuracy.

In addition, as a consequence of the selection process, salient event detection may also increase efficiency by reducing the computational bandwidth required to process speech utterances/sessions.

Figure 2A:
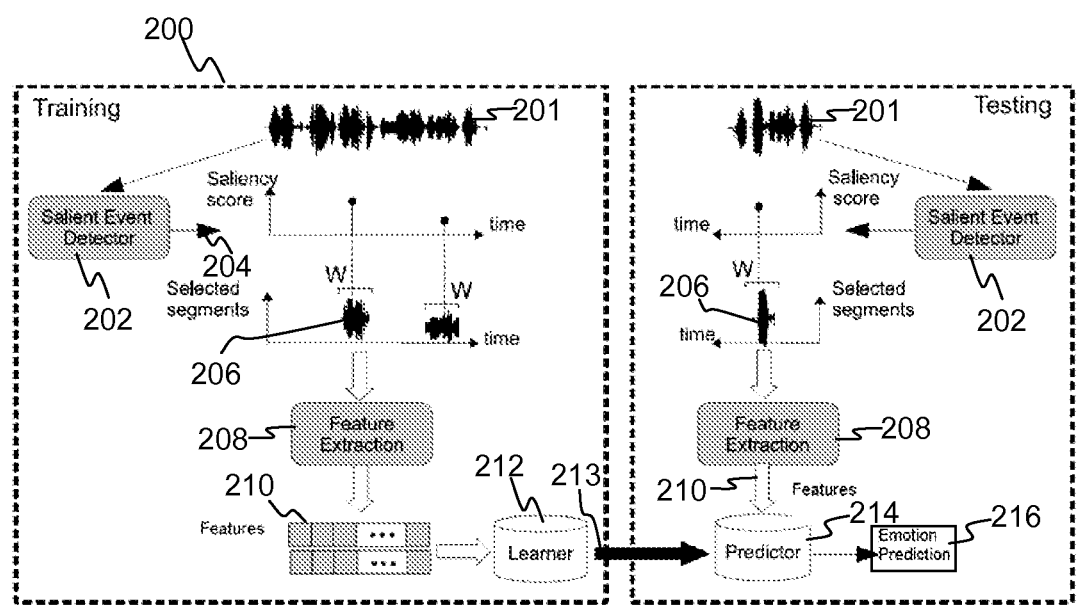
FIG. 2A is a schematic diagram depicting use of salient event detection in accordance with certain aspects of the present disclosure.
Figure 2B:
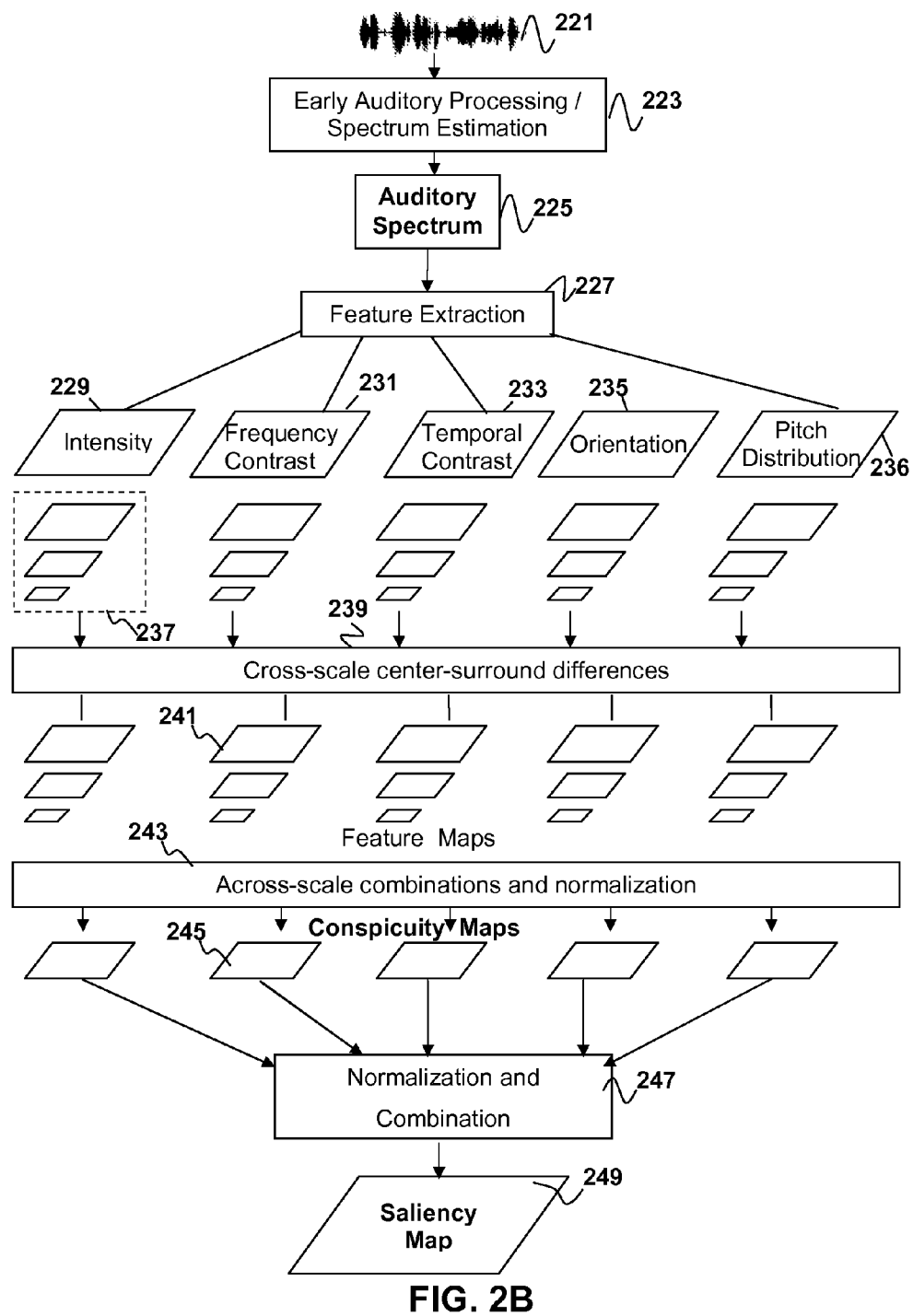
FIG. 2B is a flow diagram illustrating an example of salient event detection for emotion recognition according to aspects of the present disclosure.

In particular, FIG. 2B illustrates the bottom-up saliency-driven auditory attention model and salient event detection in a window of sound. It is noted that a bottom-up attention model—in FIG. 2B and top-down attention model in FIG. 1A share the same front end since both are based on human auditory system (i.e. same processing blocks to obtain Feature Maps from auditory attention features). FIG. 2A illustrates the interaction between bottom-up saliency-driven attention and top-down task dependent attention models. Here, it is assumed that the top-down model makes selection among the conspicuous locations detected by the saliency-driven bottom-up model.

The top down attention model 200 is task driven based on goal determined in advanced. It uses prior knowledge or past experience to focus on the target locations, e.g., uses the learned mapping between the task and features. In this example, the goal/task is to recognize emotion. The bottom up attention model 202 is signal driven not task driven. Attention is grabbed by an event. The signal may be processed without learning the mapping.

Specifically, the interaction between a bottom-up auditory attention model and top down auditory attention model 200 may operate on a window of sound as follows. A salient event detector 202 analyzes the input window of sound to detect salient events and returns a saliency score as a function of time 204. Then, audio events with sufficient saliency score can be selected for further analysis, while other portions of sound may be ignored. By way of example, for example, selection can be done in a decreasing order of saliency score; e.g., the top N saliency scores, where N can be determined experimentally. Alternatively, events with a saliency score that's exceeding a saliency threshold may be selected. Next, to capture the audio event corresponding to a salient event, the sound around each salient point is extracted using a window of duration W creating selected segments 206. In particular, portions 206 having a sufficient saliency score may be subject to feature extraction 208, e.g., in a manner similar to that described above with respect to FIG. 1A. The extracted features 210 may then serve as inputs to a machine learner 212 that is configured to learn a mapping 213 between the extracted features 210 and one or more emotion classes. During testing or runtime, in a top-down attention model 200 the saliency-based selectively extracted features 210 and learned mappings 213 may serve as inputs to an emotion predictor 214 as shown on the right side of FIG. 2A. By way of example, when the machine learner is a neural network, the predictor also becomes a neural network with the same structure, and learned mappings 213 basically carry the parameters of the trained neural network.

As stated previously, the top-down and bottom-up auditory attention models share the same front-end processing since they are based on the human auditory system; hence, FIG. 1A and FIG. 2B similar initial processing steps. Referring to FIG. 2B, the salient event detector 202 may operate on the input window of sound 201 in a manner similar to that described above with respect to FIG. 1A. In particular, the input window of sound 201 may pass through a set of processing stages 223 that operate to convert the window of sound 201 into an audio spectrum 225. The processing stages 223 can be based on the early processing stages of an auditory system, such as the human auditory system. By way of example, and not by way of limitation, the processing stages 223 may consist of cochlear filtering, inner hair cell, and lateral inhibitory stages mimicking the process from basilar membrane to the cochlear nucleus in the auditory system, e.g., as described above with respect to the processing stages 103 of FIG. 1A.

The audio spectrum 225 may be analyzed to extract multi-scale attention features 237, as indicated at 227. Auditory attention can be captured by or voluntarily directed to a wide variety of acoustical features such as intensity (or energy), frequency, temporal, pitch, timbre, FM direction or slope (called "orientation" here), etc. These features can be selected and implemented to mimic the receptive fields in the primary auditory cortex.

By way of example, and not by way of limitation, four features that can be included in the model to encompass the aforementioned features are intensity, frequency contrast, temporal contrast, orientation, e.g., with orientation angle θ={45°,135°} and (optionally) pitch distribution. Each of these features may be extracted using a corresponding two-dimensional spectro-temporal receptive filter 229, 231, 233, 235, 236 configured to mimic the certain receptive fields in the primary auditory cortex. The intensity, frequency contrast, temporal contrast, and orientation filters may be implemented as described above with respect to FIGS. 1B-1F respectively. Pitch distribution features 236 may be created using the intensity filter 229, and/or using the frequency contrast filter 231, and/or using the orientation filters 235 as also mentioned previously while describing the top-down attention model in FIG. 1A.

The feature extraction 227 may be completed using a multi-scale platform, e.g., as described above. After multi-scale features 237 are obtained, feature maps 241 are generated as indicated at 239, e.g., by performing cross-scale center-surround differences on the multi-scale features 237. The center-surround operation helps to detect local temporal and spectral discontinuities in the spectrum. It is simulated by across scale subtraction (⊖) between a "center" fine scale (c) and a "surround" coarser scale (s), yielding a feature map M (c, s): M (c, s)=|M(c)⊖M(s)|, M∈{I, F, T, $O_\theta$, P}. The across scale subtraction between two scales is computed as point wise differences across scales; for example using three center scales c={2, 3, 4} and two surround scales s=c+δ, with δ∈{3, 4}, resulting in 36 features maps.

As shown in FIG. 2B, the feature maps may be combined to provide bottom-up input to the saliency map. However, the maps have to be normalized since they represent non-comparable modalities, i.e., different dynamic ranges and feature extraction mechanisms. By way of example, and not by way of limitation, before determining the saliency map, a normalization stage 243 may use a filter to iteratively convert noisy feature maps 237 to sparse maps representing only those perceptually standing-out locations. By way of example, and not by way of limitation, an iterative nonlinear normalization algorithm N(•) may be used to normalize the feature maps in the normalization stage 243. Each feature map may be normalized in the order of within-scale and then across-scale. The normalization stage 243 may first scale maps to the range [0, 1] to eliminate dynamic range modality. Then, the normalization stage 243 may use an algorithm that implements an iterative, nonlinear operation simulating competition between the neighboring salient locations, e.g., using a large 2D difference of Gaussians filter. Each iteration step may consist of a self-excitation and inhibition induced by neighbors. This may be implemented by convolving each map with a large 2D difference of Gaussians (DoG) filter, and clamping the negative values to zero. A feature map M is transformed in each iteration step as follows:

$$\mathcal{M} \leftarrow |\mathcal{M} + \mathcal{M} *\text{DoG} - C_{inh}| \geq 0$$

where $C_{inh}$ may be 2% of the global maximum of the map. As a result of normalization, possible noisy feature maps are reduced to sparse representations of only those locations which strongly stand-out from their surroundings.

By way of example, and not by way of limitation, the normalization stage 243 may be generally configured to apply a filter that promotes salient features (i.e., maps with small number of strong peaks) and de-emphasizes non-salient features (suppresses maps with many comparable peaks).

Examples of cross-scale center-surround differences and normalization in a bottom-up attention model, are described, e.g., by O. Kalinli and S. Narayanan, in "A Saliency-Based Auditory Attention Model with Applications to Unsupervised Prominent Syllable Detection in Speech", in *Proc. of Inter-Speech* 2007, Antwerp, Belgium, August 2007, pp. 1941-1944. Then, the normalized feature maps are combined into conspicuity maps 245 at scale σ=3 using across scale addition, as indicated by the symbol "⊕".

$$\overline{M} = \bigoplus_{c=2}^{4} \bigoplus_{s=c+3}^{c+4} \mathcal{N}(M(c,s))$$

$$M \in \{I, F, T, P\}$$

and $$\overline{O} = \sum_{\theta \in \{45°, 135°\}} \mathcal{N}\left(\bigoplus_{c=2}^{4} \bigoplus_{s=c+3}^{c+4} \mathcal{N}(O(c,s))\right)$$

The conspicuity maps 245 may then be normalized again as explained above and summed, e.g., by combining the normalized maps with equal weights, as indicated at 247 to provide bottom-up input to the saliency map 249.

$$S = \frac{1}{5}(\mathcal{N}(\overline{I}) + \mathcal{N}(\overline{F}) + \mathcal{N}(\overline{T}) + \mathcal{N}(\overline{O}) + \mathcal{N}(\overline{P}))$$

The normalized conspicuity maps may also be weighted and combined to generate the saliency map. The saliency map may hold non-negative values and its maximum may define the most salient location in a 2D auditory spectrum 225.

Then, the local maxima of the 2D auditory saliency map $S(\omega, t)$ (where t and ω represent time and frequency, respectively) may be found and the audio event at the corresponding time point may be marked as salient together with its saliency score.

Alternatively, it may be assumed that saliency combines additively across frequency channels. The saliency map 249 may be summed across frequency channels for each time point, and normalized to [0, 1] range for, yielding a saliency score S(t) for each time point t. Then, the local maxima of S(t) are found and the audio event at the corresponding time point is marked as salient together with its saliency score. Later, these salient points may be selected; e.g. in the order of decreasing saliency, or by applying a saliency score threshold.

For the top down model 200 the most salient locations of the saliency maps 249 may be selected and used for emotion recognition. A maximum of a saliency map 249 may define the most salient portion of a feature map. For example, the top N salient events 206 can be selected for further processing for emotion recognition, where N can be determined with experiments. Alternatively, a saliency threshold can be set and event/s with a saliency score that is above the determined threshold may be selected for further analysis and emotion recognition. Once the salient event has been identified, feature extraction 208 may be performed on a window of sound, W, around the salient events 206. When the number of selected salient events; e.g. N, is smaller than the number of segments in an utterance or sound clip, this will result in computational cost reduction. Features that may be extracted at this stage include, but are not limited to prosodic features (e.g., pitch, intensity, duration, and variations thereon), auditory attention features (e.g., intensity, frequency, contrast temporal contrast, orientation, pitch variation following dimension reduction to remove redundant features and reduce dimension), MEL filterbank energy, MFCC, etc. or some combination of prosodic features, auditory attention features, and MEL filterbank energy, MFCC, etc. The extracted features may be sent to a machine learning algorithm to predict emotion based on salient events.

The duration of window of sound for salient event detection would be preferred to be large; i.e. whole utterance, clip, or 3-5 second window with shifting to cover the whole utterance or clip. This may be selected based on the needs and the computational limitations of a system. On the other hand, features for emotion recognition (i.e. auditory attention features) may be captured from a shorter segment; e.g., a window duration W of about 500-1000 milliseconds (ms) since only one salient emotional event (and/or its context) is being captured/extracted. In addition, the grid size m-by-n may be determined based on the performance, computational complexity, and salient event segment duration. By way of example, 8-by-10 may be a suitable number for 500 ms duration.

It is noted that previous emotion recognition algorithms generally process all utterances for emotion recognition. The proposed integrated bottom up and top-down attention driven model 200, by contrast determines which audio events are salient in the sound, i.e., which have something that grabs human attention. Only the emotionally salient locations are processed for emotion recognition. For example, when one is excited, the voice pitch gets higher. Thus, significant changes in pitch may be salient features for emotion recognition.

In addition, when a speaker normally emphasizes words there is a change in the features that can be used to identify speech portions that are salient. The effect is more pronounced when the speech involves an emotion because there is a pronounced change in the features. Again, the salient features may be attention features, prosodic features or some combination of the two. Examples of such features: intensity, frequency contrast (change in spectral domain, e.g., new frequency), temporal contrast filter (new feature that wasn't there before), orientation filters (good for detecting falling or rising pitch), and pitch distribution.

According to certain aspects of the present disclosure, one can train and adjust speech recognition models based on recognized emotion. For example, suppose people speak faster when they are happy. One may tweak the parameters of the speech recognition based on the recognized emotion to better match to the spoken utterance which may be affected by the speaker's emotion. By way of example, and not by way of limitation, many acoustic models can be pre-trained where each is tuned to a specific emotion class. For example, during training, an acoustic model can be tuned for "excited" emotion class by using data collected from users who is excited. Then, at runtime, based on user's estimated emotion state, the matching acoustic model can be used to improve speech recognition performance. Similarly, the language model and dictionary can be adapted based on the emotion. For example, when people are bored they tend to speak slower whereas excited people tend to speak faster, which eventually changes word pronunciations. The dictionary, which consists of the pronunciation of words as a sequence of phonemes, can also be dynamically adapted based on the user's emotion to better match the user's speech characteristic due to his/her emotion. Again, multiple dictionaries tuned to certain emotion classes can be created offline, and then used based on the estimated user emotion to improve speech recognition performance.

Aspects of the present disclosure also include implementations that address situations in which sounds from multiple speakers may be present in an input window of sound. For example, the input window of sound may be channelized by collecting the sound using a microphone array having two or more microphones. The signals from the different microphones may be channelized, e.g., using time delay of arrival (TDA) or intensity difference techniques to single out individual speakers. A beamformer, e.g., delay-and-sum beamformer, may be steered to a specific direction only by selecting appropriate phases for each antenna, and sound from the specified direction can be extracted. Then, emotion recognition can be performed on the extracted source signal. The beamformers are generally not perfect; hence the extracted sound source may contain some residual noise and distortion. Thus, to further reduce the mismatch between clean trained emotion models and noisy extracted sound source, emotion models can be trained using data collected in a similar environment and processed with the same beamforming technique. Alternatively, the proposed emotion recognition method could be configured to extract salient features from different sources in a single microphone signal and perform emotion recognition using selected salient events in the mono signal since saliency model inherently reduces noise by removing non-salient events from the signal.

By nature humans have differences in the ways in which they express their feelings and emotions. To improve emotion recognition performance, class-dependent (e.g. female, male, children, elderly, etc) emotion models can be trained by using data collected from the specified class during training. In addition, speaker dependent emotion recognition models can be trained to further match emotion models and a speaker's speech and emotions. Alternatively, universal emotion models can be adapted to a speaker at runtime.

Figure 3:
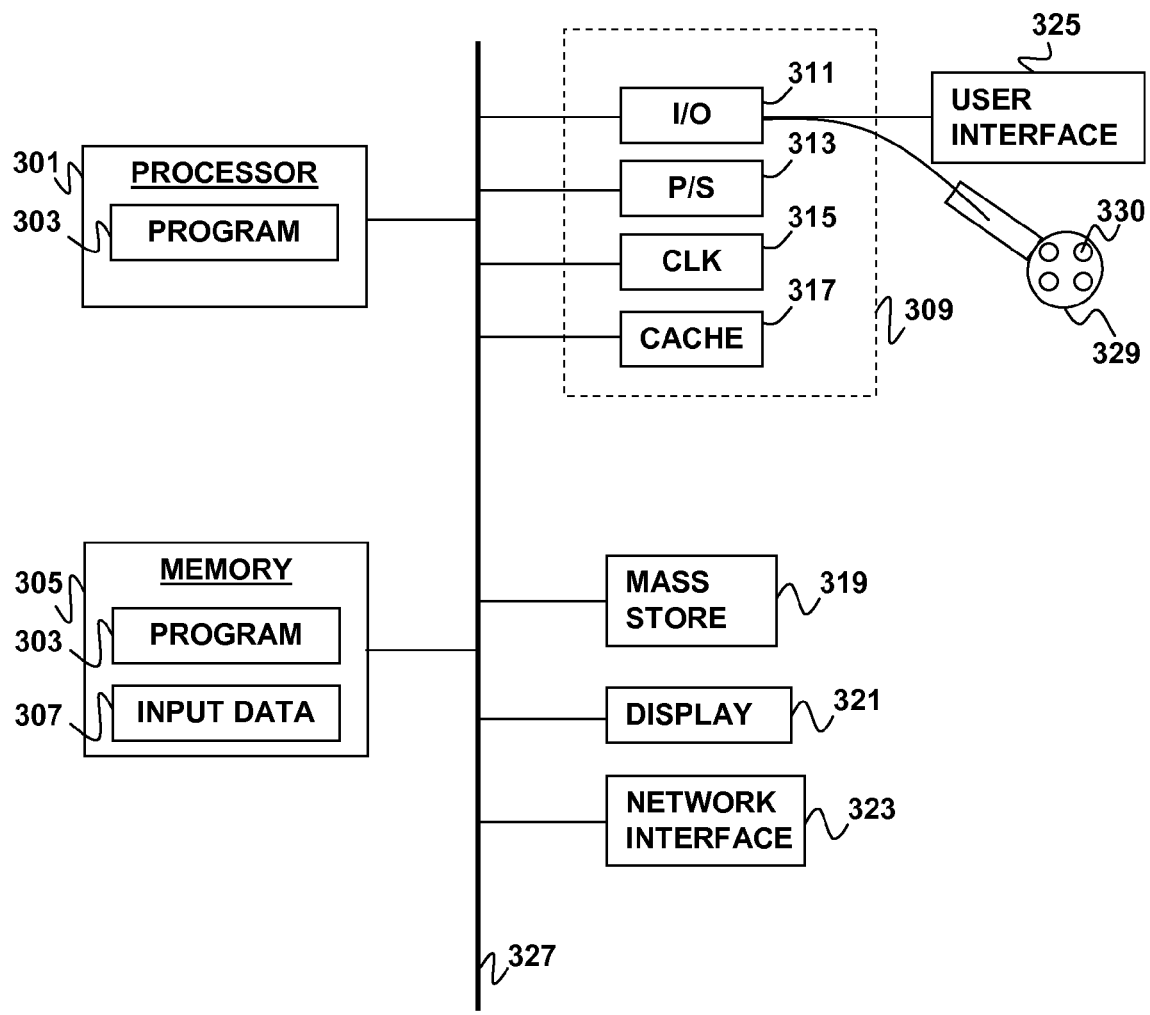
FIG. 3 is a block diagram illustrating an apparatus for emotion recognition according to an aspect of the present disclosure.

Embodiments of the invention may be implemented on a suitably configured computer apparatus. FIG. 3 illustrates a block diagram of a computer apparatus that may be used to implement a method of emotion recognition using auditory attention cues according to an embodiment of the present invention. The apparatus 300 generally may include a processor module 301 and a memory 305. The processor module 301 may include one or more processor cores. The processor module 301 may include multiple processor cores, e.g., if parallel processing is to be implemented. Examples of suitable multi-core processors, include, but are not limited to dual-core processors, quad-core processors, processor architectures having a main processor and one or more co-processors, cell processor architectures, and the like.

The memory 305 may be in the form of an integrated circuit, e.g., RAM, DRAM, ROM, and the like. The memory 305 may also be a main memory that is accessible by all of the processor modules. In some embodiments, the processor module 301 may have local memories associated with each core. A program 303 may be stored in the main memory 305 in the form of processor readable instructions that can be executed on the processor modules. The program 303 may be configured to perform emotion recognition on a window of sound using auditory attention cues as described above with respect to FIG. 1A, FIG. 2A, or FIG. 2B. The program 303 may be written in any suitable processor readable language, e.g., C, C++, JAVA, Assembly, MATLAB, FORTRAN, and a number of other languages. Input data 307 may also be stored in the memory. Such input data 307 may include input windows of sound, feature maps, or auditory gist vectors. During execution of the program 303, portions of program code and/or data may be loaded into the memory or the local stores of processor cores for parallel processing by multiple processor cores.

The apparatus 300 may also include well-known support functions 309, such as input/output (I/O) elements 311, power supplies (P/S) 313, a clock (CLK) 315, and a cache 317. The apparatus 300 may optionally include a mass storage device 319 such as a disk drive, CD-ROM drive, tape drive, or the like to store programs and/or data. The device 300 may optionally include a display unit 321 and user interface unit 325 to facilitate interaction between the apparatus and a user. The display unit 321 may be in the form of a cathode ray tube (CRT) or flat panel screen that displays text, numerals, graphical symbols or images. The user interface 325 may include a keyboard, mouse, joystick, touch screen, touch pad, or other device that may be used in conjunction with a graphical user interface (GUI). The apparatus 300 may also include a network interface 323 to enable the device to communicate with other devices over a network, such as the internet.

In some embodiments, the system 300 may include an optional microphone 329, which may be a single microphone or a microphone array. The microphone 329 can be coupled to the processor 301 via the I/O elements 311. By way of example, and not by way of limitation, different input windows of sound may be recorded using the microphone 329. In some implementations, the microphone 329 may be a single microphone or a microphone array having two or more spaced-apart microphones. Each microphone may include an acoustic transducer 330 that converts acoustic signals into electrical signals. The I/O elements 311 may be configured to convert analog electrical signals from the microphones into the digital signal data 307.

The components of the system 300, including the processor 301, memory 305, support functions 309, mass storage device 319, user interface 325, network interface 323, and display 321 may be operably connected to each other via one or more data buses 327. These components may be implemented in hardware, software or firmware or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid a latency associated with setting up the loop. As applied to embodiments of the present invention, multiple processors could extract different features from an input sound window in parallel. The intensity extraction filter, frequency contrast extraction filter, temporal contrast extraction filter, and orientation extraction filter could all process the auditory spectrum simultaneously, generating corresponding multi-scale features much more efficiently if implemented on different processor elements in parallel. Furthermore, feature maps could also be generated in parallel, as well as their corresponding auditory gist vectors. The ability to process data in parallel saves valuable processing time, leading to a more efficient and streamlined system for emotion recognition.

Figure 4:
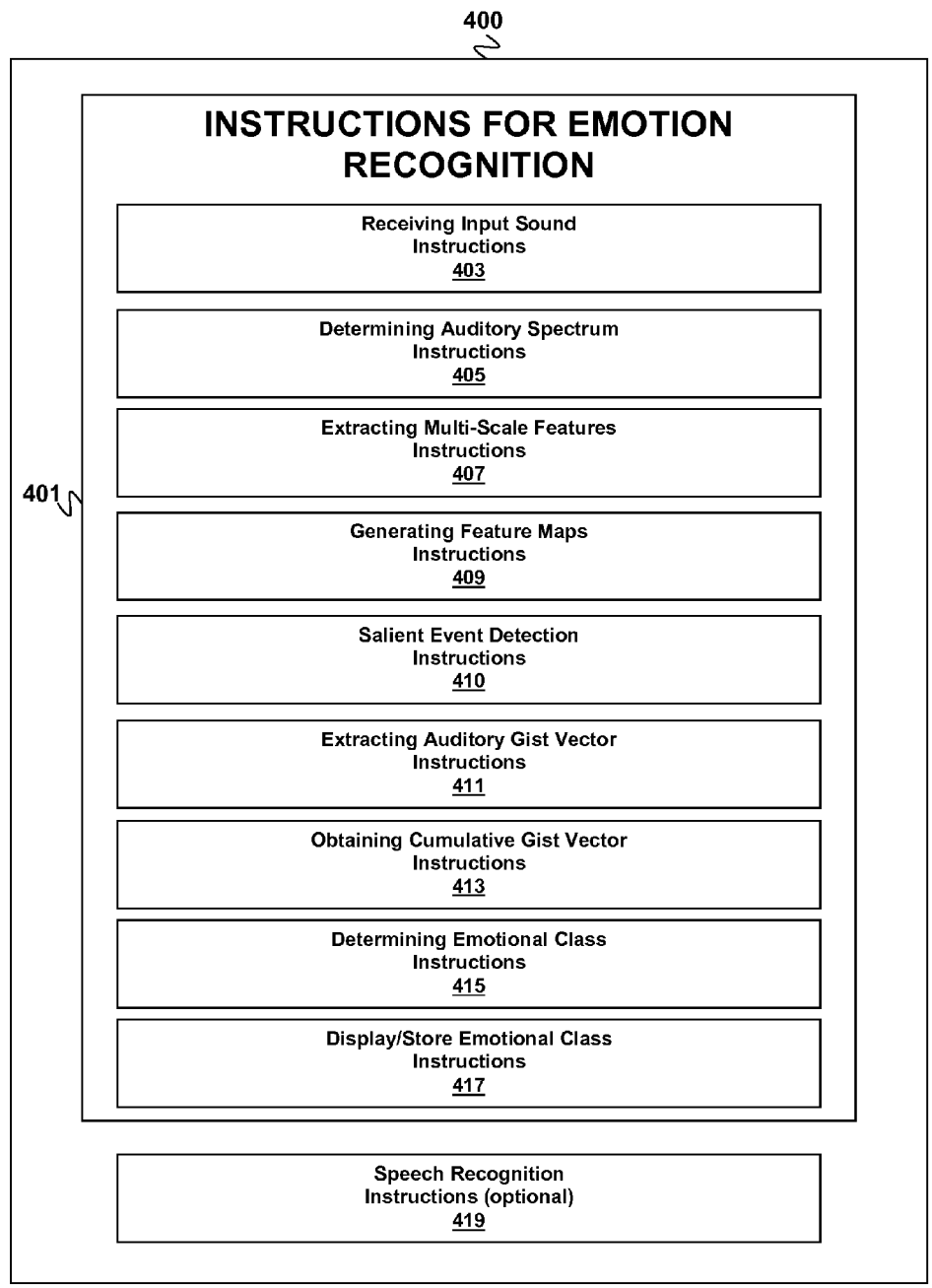
FIG. 4 illustrates an example of a non-transitory computer-readable storage medium with instructions for implementing emotion recognition according to an aspect of the present disclosure.

According to another embodiment, instructions for emotion recognition using auditory attention cues may be stored in a computer readable storage medium. By way of example, and not by way of limitation, FIG. 4 illustrates an example of a non-transitory computer readable storage medium 400 in accordance with an embodiment of the present invention. The storage medium 400 contains computer-readable instructions stored in a format that can be retrieved, interpreted, and executed by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-Ray, HD-DVD, UMD, or other optical storage medium.

The storage medium 400 contains emotion recognition instructions 401 configured to facilitate emotion recognition using auditory attention cues. The emotion recognition instructions 401 may be configured to implement emotion recognition in accordance with the method described above with respect to FIG. 1A or FIG. 2A or FIG. 2B. In particular, the emotion recognition instructions 401 may optionally include receiving input sound instructions 403 that are used to receive an input window of sound for which emotion recognition is to be performed. The input window of sound may be obtained in computer-readable form from a recording or from sounds captured live at run time by a microphone or microphone array. The emotion recognition instructions 401 may further include determining auditory spectrum instructions 405 that determine an auditory spectrum for the input window of sound using cochlear filtering, inner hair cell, and lateral inhibitory processing stages as described above.

The emotion recognition instructions 401 may also include extracting multi-scale features instructions 407 that extract multi-scale features associated with auditory spectrum when executed. These multi-scale features may include intensity, frequency contrast, temporal contrast, orientation, and (optionally) pitch distribution as described above. This may further trigger execution of the generating feature map instructions 409 that generate corresponding feature maps for each multi-scale feature extracted as discussed above when executed.

The emotion recognition instructions 401 may optionally include salient event detection instructions 410 that detect salient events associated with auditory spectrum when executed. The salient event detection instructions 410 may combine cross-scale features from the feature maps generated by the feature map instructions 409 to form conspicuity maps, e.g., as discussed above with respect to FIG. 2B. The salient event detection instructions 410 may be configured to combine (e.g., linearly) the conspicuity maps to provide bottom-up input to a saliency map. Salient segments in a window of sound may be determined from the saliency map and these segments may be subject to the operations of determining auditory spectrum instructions 405, extracting multi-scale features instructions 407, and generating feature map instructions 409. In this manner, the emotion recognition instructions 401 may implement bottom-up salient event detection in conjunction with top-down emotion recognition.

At this point, with or without bottom-up salient event detection, the emotion recognition instructions 401 may implement extracting auditory gist vector instructions 411 that extract a multi-parameter auditory gist vector for each feature map when executed.

The emotion recognition instructions 401 may additionally include obtaining cumulative gist vector instructions 413 that augment and combine all of the auditory gist vectors into a single cumulative gist vector when executed. The cumulative gist vector instructions 413 may also be configured to implement dimension reduction; e.g., principal component analysis (PCA), to remove redundancies and reduce the dimension of the cumulative gist vector when executed. The emotion recognition instructions 401 may further include determining emotional class instructions 415 that map the cumulative gist vector to its corresponding emotion class characteristic when executed.

The emotion recognition instructions 401 may optionally include display/store emotional class instructions 417. The display/store emotional class instructions 417 may cause a display associated with the aforementioned computer processing device to display characters or symbols representing the determined emotional class when executed. Execution of the display/store emotional class instructions 417 may also cause the computer processing device to store data representing the determined emotional class in an associated memory or storage device.

The non-transitory computer readable storage medium 400 may optionally include speech recognition instructions 419, which may be configured to extract a lexical meaning from the input window of sound. The speech recognition instructions may include one or more speech recognition models that may be modified according to an emotional class determined for the input window of sound by the emotion recognition instructions 401.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for emotion recognition, comprising:
   extracting one or more auditory attention features from an auditory spectrum for an input window of sound;
   generating one or more feature maps corresponding to the one or more auditory attention features; and
   extracting an auditory gist vector from each of the one or more feature maps;
   obtaining a cumulative gist vector through combination of each auditory gist vector extracted from the one or more feature maps; and
   determining one or more emotion classes corresponding to the input window of sound by mapping the cumulative gist vector to one or more emotion classes.

2. The method of claim 1, wherein determining the auditory spectrum involves passing the input window of sound through a cochlear filtering stage, inner hair cell stage, and lateral inhibitory stage that mimic transmission between the basilar membrane and the cochlear nucleus of an auditory system.

3. The method of claim 1, wherein determining the auditory spectrum involves performing a Fourier Transform on the input window of sound.

4. The method of claim 1, wherein the auditory attention features include intensity, frequency contrast, temporal contrast, and orientation associated with the auditory spectrum.

5. The method of claim 1, wherein the multi-scale features include a pitch distribution associated with the auditory spectrum.

6. The method of claim 1, wherein each feature map is obtained by computing differences between one or more center scales associated with that particular multi-scale feature and one or more surround scales associated with that particular multi-scale feature.

7. The method of claim 1, wherein each auditory gist vector is determined by dividing its corresponding feature map into an m-by-n grid of sub-regions and calculating statistics for each sub-region.

8. The method of claim 1, wherein d) includes using a dimension reduction method to remove redundancies or reduce dimensions of the cumulative gist vector.

9. The method of claim 1, wherein determining one or more emotion classes corresponding to the input window of sound includes training a model by mapping the cumulative gist vector to one or more corresponding known emotion classes for the input window of sound.

10. The method of claim 1, further comprising, adjusting a speech recognition model applied to the input window of sound according to a recognized emotion class determined for the input window of sound.

11. The method of claim 1, wherein analyzing the one or more feature maps to determine one or more emotion classes corresponding to the input window of sound includes extracting an auditory gist vector from each of the one or more feature maps; obtaining a cumulative gist vector through combination of each auditory gist vector extracted from the one or more feature maps; using a dimension reduction method to remove redundancy and reduce dimension; and determining one or more emotion classes corresponding to the input window of sound by mapping the final dimension reduced auditory gist vector to one or more emotion classes.

12. The method of claim 11, wherein determining one or more emotion classes corresponding to the input window of sound includes comparing the auditory gist vector against a trained model to determine one or more emotion classes for the input window of sound.

13. The method of claim 11, further comprising determining one or more salient portions of the input window of sound, wherein extracting one or more auditory attention features from the auditory spectrum includes extracting one or more auditory attention features from the one or more salient portions.

14. The method of claim 13, wherein extracting one or more auditory attention features from the one or more salient portions includes ignoring remaining portions of the input window of sound.

15. The method of claim 13, wherein determining one or more emotion classes corresponding to the input window of sound includes comparing the auditory attention features extracted from the one or more salient portions to one or more learned auditory attention features for known emotion classes.

16. The method of claim 13, further comprising learning a mapping between the one or more auditory attention features extracted from the one or more salient portions and one or more emotion classes.

17. The method of claim 13, wherein determining one or more salient portions of the input window of sound includes extracting one or more auditory attention features from the auditory spectrum, generating one or more feature maps corresponding to the one or more auditory attention features, and normalizing the one or more feature maps within-scale, across-scale, and across-features to produce normalized feature maps.

18. The method of claim 17, wherein normalizing the one or more feature maps includes use of an iterative, nonlinear operation simulating competition between neighboring salient locations using a two-dimensional difference of Gaussians filter.

19. The method of claim 17, wherein determining one or more salient portions of the input window of sound further includes summing the normalized maps to provide a bottom-up input to a saliency map.

20. The method of claim 19, wherein determining one or more salient portions of the input window of sound further includes summing the saliency map across frequency channels for each time point in the input window of sound and normalizing the resulting sum to yield a saliency score for each time point in the input window of sound.

21. The method of claim 20, wherein determining one or more salient portions of the input window of sound further includes determining one or more local maxima of the saliency score for the input window of sound.

22. The method of claim 19, wherein the saliency map is a two-dimensional (2D) saliency map wherein determining the salient portions of the input window of sound includes finding local maxima of the 2D saliency map.

23. The method of claim 1, wherein the one or more emotion classes are determined before performing speech recognition on the input window of sound.

24. An emotion recognition apparatus, comprising:
a processor;
a memory; and
computer coded instructions embodied in the memory and executable by the processor, wherein the computer coded instructions are configured to implement a method for emotion recognition, the method comprising:
extracting one or more auditory attention features from an auditory spectrum for an input window of sound;
generating one or more feature maps corresponding to the one or more auditory attention features; and
extracting an auditory gist vector from each of the one or more feature maps;
obtaining a cumulative gist vector through combination of each auditory gist vector extracted from the one or more feature maps; and
determining one or more emotion classes corresponding to the input window of sound by mapping the cumulative gist vector to one or more emotion classes.

25. The apparatus of claims 24, wherein the one or more emotion classes are determined before performing speech recognition on the window of sound.

26. A computer program product comprising:
a non-transitory, computer-readable storage medium having computer readable program code embodied therein, wherein the computer coded instructions are configured to implement a method for emotion recognition upon execution, the method comprising:
extracting one or more auditory attention features from an auditory spectrum for an input window of sound;
generating one or more feature maps corresponding to the one or more auditory attention features; and
extracting an auditory gist vector from each of the one or more feature maps;
obtaining a cumulative gist vector through combination of each auditory gist vector extracted from the one or more feature maps; and
determining one or more emotion classes corresponding to the input window of sound by mapping the cumulative gist vector to one or more emotion classes.

27. The product of claim 26, wherein the one or more emotion classes are determined before performing speech recognition on the input window of sound.

* * * * *